Sept. 29, 1936.  A. A. HODGKINS  2,056,006
CONTROL FOR FLUID OPERATED DEVICES
Filed May 12, 1931  5 Sheets-Sheet 3
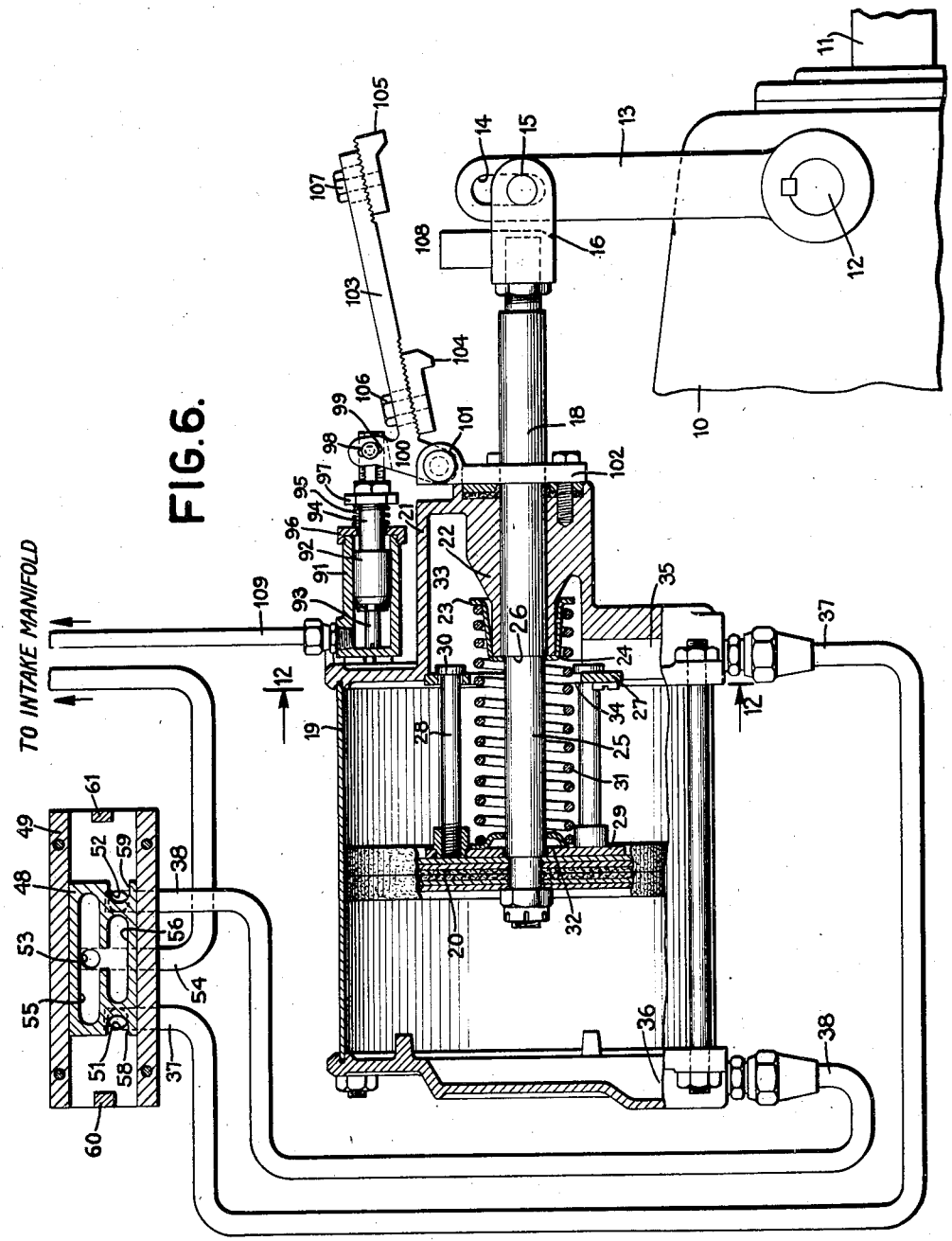
INVENTOR
ALBERT A. HODGKINS
BY Frederick Griswold Jr.
ATTORNEY Sept. 29, 1936.　　　　A. A. HODGKINS　　　　2,056,006
CONTROL FOR FLUID OPERATED DEVICES
Filed May 12, 1931　　　　5 Sheets-Sheet 4
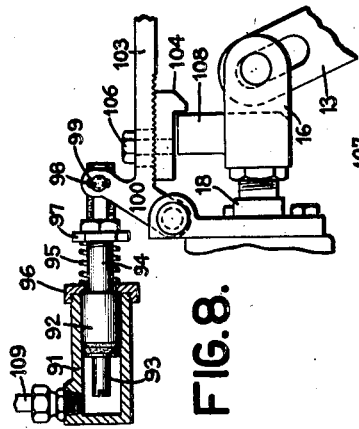
INVENTOR
ALBERT A. HODGKINS
BY
Frederick Griswold Jr
ATTORNEY

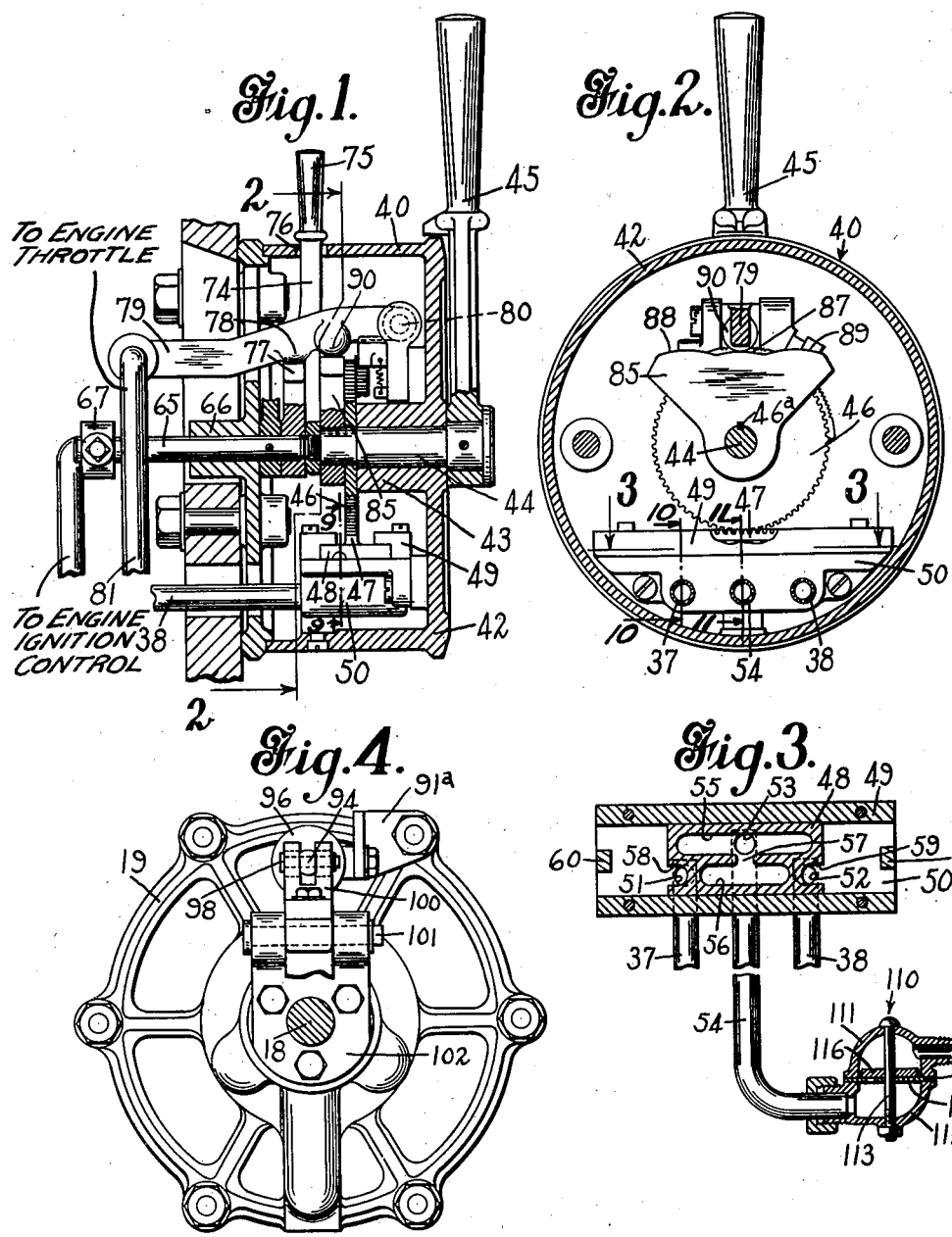

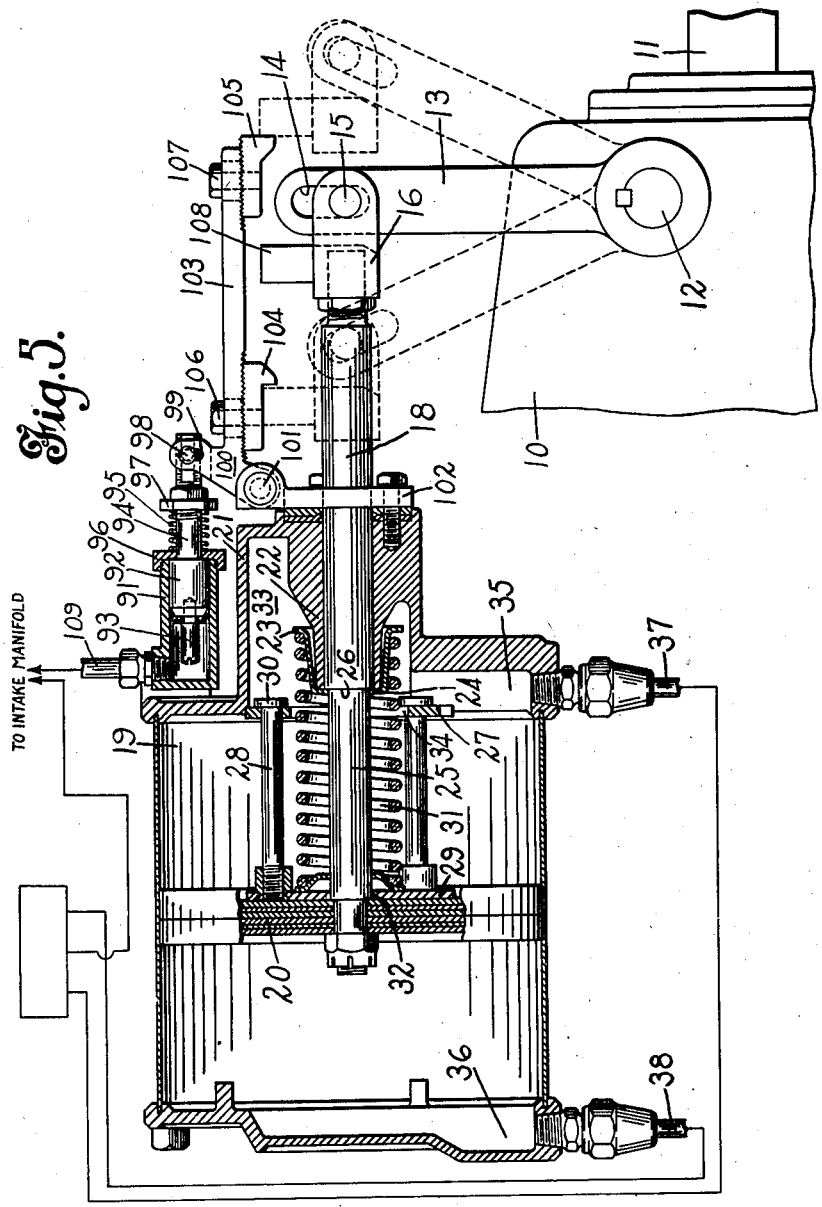

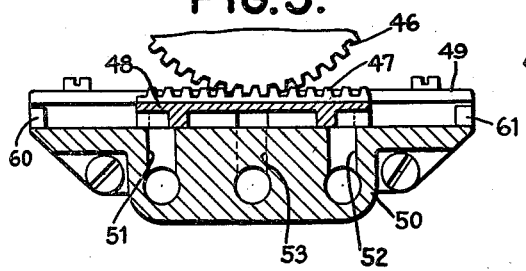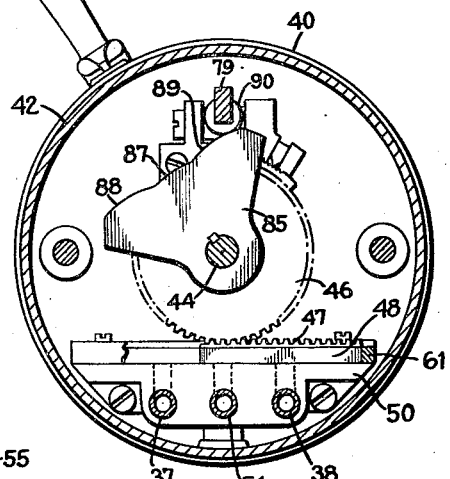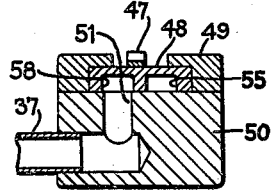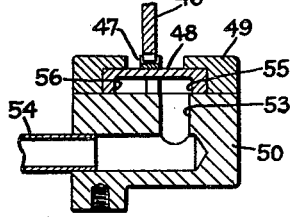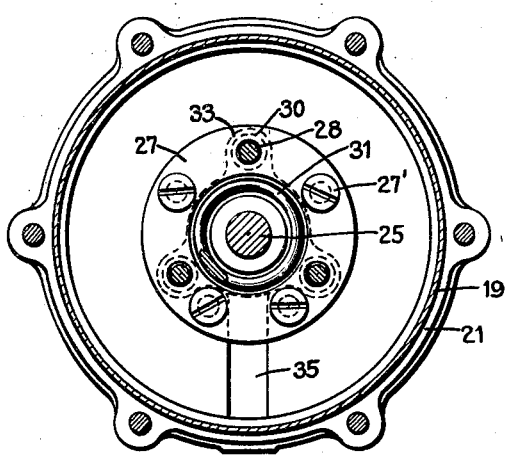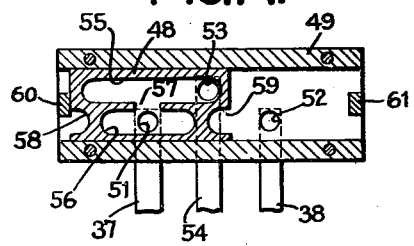

Patented Sept. 29, 1936

2,056,006

UNITED STATES PATENT OFFICE 2,056,006

CONTROL FOR FLUID OPERATED DEVICES

Albert A. Hodgkins, Leonia, N. J., assignor to Universal Gear Shift Corporation, New Haven, Conn., a corporation of Delaware Application May 12, 1931, Serial No. 536,755

12 Claims. (Cl. 121—40)

This invention relates to control mechanism for transmission gearing and more particularly to control mechanism for reverse gearing of the type ordinarily used in connection with marine engines such as motor boat engines or the like, but it will be understood that the improvements herein described and claimed are not limited to such use and are applicable to gear controls of other types. In some of its aspects the invention pertains to controlling mechanism broadly without regard to whether gears or other members are acted upon.

As illustrated herein, the control of the gears so as to change from one speed to another, such as a change from forward to reverse for example, is effected by means of vacuum or reduced air pressure, the source of which may conveniently be the intake manifold of the engine if an internal combustion engine is used as the motive power of the device with which the gear is employed. As will be understood, when an engine of this type is accelerated, or when it is required to pull against a heavy load, the degree of vacuum or reduced air pressure at the intake manifold is greatly reduced. Therefore, where the control of the gears is affected by this vacuum, and particularly where the gears are held in a predetermined relation by the engine vacuum working against a spring or similar means which tends to restore the gear to a neutral position, it is desirable to provide some means to hold the gears in the said predetermined relation against the action of the spring in case the degree of vacuum should be reduced to such an extent that the force of the vacuum tending to hold the gears in place would be overcome by the force of the spring.

One object of the present invention, therefore, is to provide in a fluid pressure gear controlling device means to lock the gear controlling means against movement when set in a predetermined position.

Another object of the invention is to provide, in a fluid pressure gear control means, automatic means to lock the control means against movement in case of the failure of the fluid pressure to hold the control means in place.

A still further object of the invention is to provide, in a vacuum operated gear control device, automatic means to hold the gears in a predetermined adjusted position in case the degree of vacuum falls to a degree insufficient to maintain the gears in the desired relation.

More specifically the invention resides in providing a piston and cylinder device operated by vacuum from the manifold of an internal combustion engine to change the relation between the gears of a transmission gearing, and to provide locking means also operated by the vacuum of the engine arranged to lock the piston against movement when the vacuum drops to such an extent as to be insufficient to perform this function.

To these and other ends, the invention consists in the novel features and combination of parts to be hereinafter described and claimed.

In the accompanying drawings:

Fig. 1 is a sectional view of a control box for a gearing embodying my invention;

Fig. 2 is a sectional view on line 2—2 of Fig. 1;

Fig. 3 is a sectional view on line 3—3 of Fig. 2;

Fig. 4 is a front elevational view of the control cylinder and associated parts;

Fig. 5 is a sectional view of this cylinder showing the automatic locking means therefor in operative position.

Figure 6 is a view showing the control cylinder in neutral position but released for movement and the control or selector valve therefor in corresponding position, the parts being in section.

Figure 7 is a view similar to Figure 6 but with the cylinder and valve in position for forward drive, the piston not being locked.

Figure 8 is a fragmentary view showing the gear shifting arm in the same position shown in Figure 7 but with the locking means engaging and locking the piston rod in that position.

Figure 9 is a fragmentary view on an enlarged scale showing the control valve and ports of Figure 2 in longitudinal section taken in the plane indicated by the line 9—9 of Figure 1 and looking in the direction of the arrows.

Figure 10 is a fragmentary transverse sectional view of the control valve, taken in the plane indicated by the line 10—10 of Figure 2.

Figure 11 is a view similar to Figure 10 but taken on the line 11—11 of Figure 2.

Figure 12 is a transverse sectional view of the control cylinder taken in the plane indicated by the line 12—12 of Figure 6, looking in the direction of the arrows and showing the method of mounting the guide plate on the cylinder.

Figure 13 is a view similar to Figure 2 but showing the parts in a shifted position, and Figure 14 is a view similar to Figure 3 but showing the valve in a shifted position.

To illustrate a preferred embodiment of my invention, I have shown in the drawings a gear controlling device applied to a marine gear of the usual or ordinary type, the controlling device being similar in many respects to that shown in my co-pending application Serial No. 528,840, filed April 9, 1931, and issued as Patent No. 2,023,229, December 3, 1935. A marine gear to which the invention is applicable is shown, for instance, in my United States Letters Patent No. 1,936,626 dated November 28, 1933. The housing of the gear is shown at 10 in Fig. 5, the propeller shaft 11 projecting from this housing. Also projecting from the housing is a rock shaft 12 on which is secured an arm 13.

It will be understood that the usual type of marine gear, as illustrated, may be set in three positions, a neutral position which obtains when the arm 13 is, as shown in full lines in Figures 5 and 6, in a substantially vertical position, a position for forward drive when the arm 13 is moved to the left, as shown in dotted lines in Figure 1 and in full lines in Figures 7 and 8, and a position for reverse drive when this arm is moved to the right as also shown in dotted lines in Figure 5. It will, of course, be understood that this particular arrangement is shown by way of illustrating one type of gear control to which the invention is applicable.

The arm 13 is provided at its upper end with a slot 14 within which is loosely engaged a pin 15 carried by a clevis 16 secured to a piston rod 18, which rod projects from the cylinder 19 and has mounted thereon within the cylinder a piston 20, the relation being such that, as the piston is moved in one direction or the other in the cylinder from an intermediate position, the arm 13 will be rocked to the right or left, as shown.

At one end of the cylinder is provided a hollow boss 21 within which is a thimble 22 surrounding the piston rod 18, the end of which thimble acts as a stop for a spring shoe 23. This spring shoe is provided with an inturned portion 24 at one end which surrounds a reduced portion 25 of the piston rod, so that when the piston moves in one direction, the shoe will be picked up and moved with it by the shoulder 26 provided at the end of the reduced portion 25.

Secured as by screws 27', Figure 12, one end wall of the cylinder is a supporting plate 27 through openings in which pass a number of bolts 28, the bolts having secured upon their ends a plate 29. The opposite ends of the bolts are provided with enlarged heads 30 which limit their movement in one direction through the plate 27. A spring 31 surrounds the piston rod within the cylinder and bears at one end against the spring shoe 23 and at the other end against the plate 29. The latter plate, while resting against the piston 20, is not secured thereto, and is also provided with a central opening 32 through which the reduced portion 25 of the piston rod moves freely. It will be understood, however, that the plate 29 will be moved to the right by the piston when the latter moves in this direction from the intermediate position shown in Fig. 5, and at this time the bolts 28 secured to the plate 29 will move to the right through the openings in the plate 27 into the hollow portion 33 of the boss 21. The spring 31 passes freely through an opening 34 in the plate 27 so that its end bears against the shoe 23. When the piston moves to the left as shown in Figure 7, the plate remains stationary, the spring 31 being compressed by the shoe 23 which is carried to the left by the shoulder 26 on the piston rod 18 in its movement.

The ends of the cylinder 19 are provided with fluid passages 35 and 36 which are connected respectively with tubes or pipes 37 and 38, by which fluid under pressure or vacuum may be introduced into the cylinder upon either side of the piston.

The pipes 37 and 38 lead to a valve mechanism in a control box 40 which may be mounted on the bridge deck of the boat at a point remote from the engine or at any other convenient position. The control box 40 comprises a casing 42 provided with a bearing 43 within which is rotatably mounted a shaft 44 which projects from the box and has secured to its projecting end a control handle or lever 45. A gear 46 is keyed to shaft 44 by the key 46ª, the teeth of which engage the teeth of a rack 47 upon a sliding valve 48, this valve being slidably secured by means of guide members 49 to a valve box 50 secured in the lower portion of the casing 42.

As shown in Figs. 3 and 14, the valve box 50 is provided with three ports 51, 52 and 53, the pipes 37 and 38 communicating respectively with the ports 51 and 52, while from the port 53 a pipe 54 extends to the intake manifold of the engine so as to be connected with a source of vacuum or reduced air pressure. The valve 48 is provided with passages 55 and 56, which are in communication with each other through the passage 57, the passage 55 registering with the port 53 and being of such a length that this passage and also, of course, the passage 56 will be in communication with the engine vacuum regardless of the position of the valve.

Opposite the passage 56 are provided recesses 58 and 59 opening through the ends of the valve. These recesses and the passage 56 register or are in line with the ports 51 and 52, so that when either of these recesses register with the respective ports, Figure 14, the latter are vented to the atmosphere, and when the passage 56 registers with either of the ports, such port will be in communication with the engine vacuum through the passage 55 and port 53. It will be observed that the passage 56 is of sufficient length so that a considerable movement of the valve is permitted while the port 51 or 52, as the case may be, remains in communication with the source of vacuum.

From the foregoing it will be understood that, when the control handle is in a neutral position, for instance in the upright position shown in the drawing, the valve 48 will be in the position shown in Fig. 3 wherein both ports 51 and 52 are vented to the atmosphere, and at this time both ends of the cylinder 19 will contain air under atmospheric pressure, the piston 20 remaining in an intermediate position as determined by the spring 31. When, however, the control lever 45 is moved in one direction or the other from this neutral position, the valve 48 will be correspondingly moved to cause the registration of the passage 56 with the port 51 or 52, and subject one end of the cylinder 19 to reduced air pressure. This condition will obtain when one of the ports, say the port 51, Figure 14, comes into registration with the passage 56, and will, of course, continue although the valve 48 may be moved still further to the left, as shown in this figure, due to the length of the passage in the valve. The valve 48 may be moved to the left to its extreme position against the stop 60, while the port 51 remains in communication with the passage 56. A similar stop 61 is provided upon the other end of the valve block 50 to limit the movement of the valve in the opposite direction.

At the rear of the housing 42 a shaft 65 is rotatably mounted in a bearing 66, which shaft through a link 67 may lead to the distributor or ignition controlling device of the engine to advance or retard the spark in a well-known manner. Loosely mounted on the shaft 65 is a lever 74 the end 75 of which projects through a slot 76 in the casing for manual manipulation. Upon the lever 74 is provided a cam member 77 upon the cam surface of which rests a boss 78 formed upon a lever 79 pivoted at 80 within the casing 42. One end of the lever 79 projects from the rear of this housing and has secured to its end a link 81, which leads to the engine throttle to control the engine speed in a well-known manner.

It will be found advantageous to so connect the gear control and the engine speed control that both may be operated by the same lever simultaneously. To effect this result a cam member 85 is secured to the shaft 44 by means of the key 46ª. The cam 85 is provided with a cam surface comprising three distinct portions, an intermediate dwell portion 87, and outer actuating portions 88 and 89, the surfaces 87, 88 and 89 all being adapted to engage a boss 90 provided on the lever 79.

The dwell portion 87 of the cam is so constructed that, as long as the boss 90 is engaged with this portion, no movement of the lever 79 will be effected, that is, this portion of the cam is substantially in the form of an arc about the shaft 44 as a center. When, however, the cam 85 is moved in either direction so that the portion 87 travels beyond the boss and the latter is engaged by either of the portions 88 or 89, say, the portion 89, Figure 13, the lever 79 will be moved upwardly and effect an acceleration of the engine.

The dimensions of the cam surfaces may preferably be such that the engine will operate at idling speed so long as the boss 90 is engaged with the dwell portion 87 of the cam, but will be accelerated when the boss is engaged with either of the surfaces 88 or 89. It will be found to be desirable to have the boss picked up by the surfaces 88 or 89 just prior to the placing of the gear in either reverse or forward drive so that the engine speed will be slightly accelerated when the load is placed upon it. It will, of course, be understood that when the gear is in neutral the portion 87 of the cam controls the position of the lever 79, so that the engine, when controlled by the lever 45 will be brought to idling speed between a change from forward to reverse or vice versa.

From the foregoing description it will be apparent that when the vacuum is admitted to the left hand end of the cylinder 19 through the conduit 38, the piston 20 will be drawn to the left, Figure 7, and in this position, the action of the spring 31, which will be compressed, will tend to restore the piston to its intermediate position in the cylinder which determines the neutral position of the transmission gearing. If, at this time the engine should be accelerated and as a consequence the degree of vacuum in the manifold fall to a point wherein the pull of this vacuum on the piston is overcome by the spring, the force of the latter would restore the piston to an intermediate position in the cylinder and shift the gearing to a neutral position. In order to prevent such an occurrence, I have provided an automatic locking device also controlled by the engine vacuum which will lock the lever 13 in its adjusted position if the degree of vacuum in the intake manifold falls to a point at which it would be insufficient to overcome the tension of the spring 31.

For this purpose I have secured a small cylinder 91 to the cylinder 19 by means of the bracket 91ª. Within the cylinder 91 is a piston 92 provided with an adjustable stop pin or screw 93 to control the length of travel of the piston. The piston 92 has a reduced end 94 which projects from the cylinder, this portion being surrounded by a compression spring 95 which acts between the cylinder head 96 and a stop 97 secured upon the portion 94. This stop 97 is, in the form shown, a flanged nut threaded upon the end 94 of the piston.

Passing through the end portion of the member 94 is a pin 98 which is received in slots 99 in the bifurcated end of a lever 100 pivoted at 101 to a bracket 102 secured to the cylinder 19. The lever 100 is provided with an arm 103 upon which are adjustably secured pawls 104 and 105 by means of bolts or screws 106 and 107 respectively. Upon the piston rod 18 is secured a stop 108 which is designed to be engaged by the pawls 104 and 105. The cylinder 91 is provided at one end with an inlet 109 which leads to the intake manifold of the engine.

The tension of the spring 95 is so adjusted that when a degree of vacuum exists in the intake manifold and, therefore, in the cylinder 91, sufficient to operate the piston 20 and hold it in adjusted position, this vacuum will draw the piston 92 to the left, as shown in Fig. 5, against the tension of the spring 95, and hold the lever 103 in its raised position, as shown in Figures 6 and 7. When, however, the degree of vacuum in the intake manifold falls, the spring 95 will move the piston 92 outwardly prior to the movement of the piston 20, so that the pawl 104 or 105 will engage the stop 108, Figure 8, and prevent movement of the piston 20 by the spring 31. Preferably the pawls 104 and 105 are so located that the stop 108 will be moved slightly beyond the pawls by the movement of the piston 20, so that these pawls, when the arm 103 is released by the vacuum and moved by the spring 95, will drop into holding position. Then, when the spring 31 overcomes the vacuum in the cylinder 19, the stop 108 will be allowed to move slightly against the pawl and will be retained against such movement as would affect the relation of the gear.

It will also be apparent that just as quickly as the degree of vacuum rises (this will be the case when the load is taken off the engine as will be done when it is desired to shift the gears) the vacuum in the cylinder 91 will overcome the spring 95 and raise the lever 103 so that the arm 13 will be free for movement by the controlling piston 20.

When the degree of vacuum rises, it will be apparent that the stop 108 will, under the action of the spring 31, bind against the pawl 104 which may be holding the piston against movement, and if the cylinder 91 is relatively small, the force of the vacuum therein might not be sufficient to overcome this binding action and raise the lever 103. However, as stated above, the relation of the parts is such that the stop 108 will, when moved by the piston 20, pass slightly beyond the holding surface of the pawl. Therefore, as soon as the degree of vacuum becomes sufficiently high to raise the lever 103, the piston 20 will be drawn slightly to the left as shown in Fig. 8, so as to relieve the binding action on the pawl 104.

In order to prevent gases which might occur from the backfire of the engine passing through the tube 54 to the valve 48, and also to prevent as far as possible loss of vacuum in the cylinder 20, a check valve 110 is mounted in the tube 54 between the valve 48 and the manifold intake. This valve comprises casing parts 111 and 112 secured together by a bolt 113. Between the casing parts is a partition member 114 provided with a number of openings 115, which openings are controlled by a disk valve 116 resting on the partition member and freely movable upwardly on the bolt 113. The tube 54 enters the lower half 112 of the valve casing and the tube 54a leads from the upper half to the intake manifold.

It will be apparent that with this construction when the pressure in the intake manifold is lower than that in the tube 54 the disk valve 116 will be lifted from its seat and allow air to be drawn past the valve into the intake manifold. When, however, the opposite condition obtains, the valve will seat itself due to pressure thereabove and this will prevent pressure in the tube 54a entering the tube 54.

What I claim is:

1. In a control device, a movable control member, fluid pressure operated means to move said member in a predetermined position, a source of variable fluid pressure, means affording communication between said source of fluid pressure and said fluid pressure operated means, valve means to control said communication, a locking device to hold said control member against movement, a second fluid pressure operated means to move said locking device to inoperative position, and means preventing said movement when the fluid pressure at said source is insufficient to hold said control member and said second fluid pressure operated means being in constant communication with said source of fluid pressure independently of said first-named fluid pressure operated means.

2. In a control device for gear mechanism associated with an internal combustion engine, a movable control member, fluid pressure operated means to move said member, locking means to hold said member in predetermined position, fluid pressure operated means to move said locking means to inoperative position, and a spring to move said locking member to operative position, both of said fluid pressure operated means being energized by fluid pressure at the intake manifold of the engine, and said spring being tensioned to move said locking device to operative position when the fluid pressure at said intake is insufficient to hold said member after movement by said first-named fluid pressure operated means, valve means to control communication of said first named fluid pressure operated device with said intake independently of said second-named fluid pressure operated means, and said second named fluid pressure operated means being in constant communication with said intake.

3. In combination a movable gear control member, a pneumatically-operated device to move said member and hold it in the position to which it is moved, a locking device to hold said member against movement, pneumatically-operated means to move said locking device to inoperative position, and a common source of variable fluid pressure for energizing both of said pneumatically-operated devices, and means to move said locking device to operative position when the fluid pressure is insufficient to hold the control member, and said pneumatically operated devices being connected to said source of fluid pressure independently of each other.

4. In a gear control device, a gear control member, a fluid pressure operated device to move said member and including a spring acting to oppose the movement, a locking device to hold said control member in predetermined position, a fluid pressure operated device to move said locking member to operative and inoperative positions and including a spring to oppose the movement, said fluid pressure devices being independently energized from a common source of variable pressure, and said devices being arranged whereby the spring of said locking device will move it to operative position prior to the overcoming of the fluid pressure by the spring of said control-member moving device.

5. In combination with an internal combustion engine and a reverse gear associated therewith, reverse gear controlling means comprising a cylinder, a piston therein operatively connected to the reverse gear, means affording communication between the engine intake and said cylinder to effect a pressure difference to move the piston, and a spring tending to maintain said piston in a predetermined position, a locking device for holding the piston in the position to which it has been moved, and means operated by the pressure at the intake of the engine to move said locking device to inoperative position when idling speed of said engine is effected, said last-named means being in communication with said engine intake independently of said cylinder.

6. In combination with an internal combustion engine and a reverse gear associated therewith, reverse gear controlling means comprising a cylinder, a piston therein, means to admit fluid pressure from the engine intake to said cylinder to move the piston, and a spring tending to oppose said piston movement, a locking device for holding the piston in the position to which it has been moved, and means to move said locking device to inoperative position when idling speed of said engine is effected, said last-named means comprising a pneumatically operated device in constant communication with the intake manifold of the engine independently of said cylinder.

7. In combination with an internal combustion engine and a gear associated therewith, a movable gear control member, means to move said member, said member being in communication with and operable by the reduced pressure at the intake manifold of the engine, a locking device to prevent return movement of said control member, means in constant communication with and operable by the reduced pressure at the intake manifold of the engine to move said locking device to inoperative position, a spring to move said locking device to operative position when the degree of vacuum at the intake manifold falls below a predetermined amount, and means to control the communication of said first named means with the engine intake independently of the means to move the locking device.

8. In a gear control device for use with an internal combustion engine, a gear control member, a fluid pressure operated device to move said member, including a spring acting to oppose said movement, a locking device to hold said control member in the position to which it is moved, a fluid pressure operated device to move said locking member to inoperative position and having a spring to oppose said movement, said fluid pressure operated devices being independently connected to the intake manifold of the engine for actuation by the reduced pressure there existing, and said devices being arranged whereby the spring of said locking device will move it to operative position prior to the overcoming of the fluid pressure by the spring of said control member moving device.

9. In combination with an internal combustion engine and a transmission gearing associated therewith, a gear operating member, means to actuate said member, said means being actuated by fluid pressure from the intake manifold of the engine, a movable locking device to hold said member against movement, and means for moving said locking device to inoperative position when the degree of fluid pressure at the intake manifold is sufficient to actuate said member, said last-named means being in communication with the fluid pressure at the intake manifold independently of the said actuating means.

10. In combination with an internal combustion engine and a reverse gearing associated therewith, reverse gear controlling means operatively connected to the reverse gear, said means comprising a cylinder and a piston therein, valve means for connecting either end of the cylinder with the intake of the engine, a locking device for holding the piston against movement, and means communicating with the engine intake to move said locking device to inoperative position when idling speed of said engine is effected, said communication being independent of said valve means.

11. In combination with an internal combustion engine having an intake manifold in which the pressure varies according to the speed of the engine, a gear mechanism associated with the engine, a gear control member operatively connected to the gear mechanism, pneumatically operated means to move said member, a communicating connection between the pneumatically operated means and the intake manifold of the engine, means to selectively admit air to one side of the pneumatically operated means and open the other side to the intake manifold, means for locking the pneumatically operated means in a predetermined position, automatic means for moving the locking means to inoperative position, said automatic moving means being responsive to fluid pressure existing in the intake manifold of the engine and operative at a predetermined pressure therein corresponding to the idling speed of the engine and a continuously open communicating connection between the intake manifold and said automatic moving means for the locking means.

12. In a gear controlled device, a movable gear controlling member, a pneumatic motor connected to said controlling member and adapted to actuate the same, a locking device for controlling the movement of said controlling member, a source of variable pressure, means associated with said locking device and constantly connected to said source of pressure, said means being adapted to move the locking device into unlocked position upon a predetermined pressure at said pressure source, a connection between said pneumatic motor and source of variable pressure, and a valve for controlling the application of pressure through said connection to said motor independently of the connection between the source of pressure and said means for moving and locking device.

ALBERT A. HODGKINS.

CERTIFICATE OF CORRECTION.

Patent No. 2,056,006.                                September 29, 1936.

ALBERT A. HODGKINS.

It is hereby certified that error appears in the printed specification of the above numbered patent requiring correction as follows: Page 5, second column, line 30, claim 12, for the word "and" read the; and that the said Letters Patent should be read with this correction therein that the same may conform to the record of the case in the Patent Office.

Signed and sealed this 8th day of December, A. D. 1936.

(Seal)
                                              Henry Van Arsdale
                                         Acting Commissioner of Patents.